United States Patent
Costas

(10) Patent No.: US 7,834,475 B1
(45) Date of Patent: Nov. 16, 2010

(54) APPARATUS FOR CONVERTING WAVE ENERGY

(76) Inventor: Dan Nicolaus Costas, 3876 1/2 College Ave., Culver City, CA (US) 90232

( * ) Notice: Subject to any disclaimer, the term of this patent is extended or adjusted under 35 U.S.C. 154(b) by 0 days.

(21) Appl. No.: 12/772,217

(22) Filed: May 2, 2010

Related U.S. Application Data

(60) Provisional application No. 61/215,251, filed on May 4, 2009, provisional application No. 61/216,814, filed on May 22, 2009, provisional application No. 61/270,994, filed on Jul. 16, 2009.

(51) Int. Cl.
*F03B 13/24* (2006.01)

(52) U.S. Cl. .............. 290/53; 290/42; 60/398; 60/497; 405/21

(58) Field of Classification Search ......... 290/42, 290/43, 44, 53, 54, 55; 60/398, 497; 405/21
See application file for complete search history.

(56) References Cited

U.S. PATENT DOCUMENTS

| | | | | | |
|---|---|---|---|---|---|
| 3,922,739 | A | * | 12/1975 | Babintsev | 441/16 |
| 3,965,364 | A | * | 6/1976 | Gustafson et al. | 290/53 |
| 4,078,871 | A | | 3/1978 | Perkins, Jr. | |
| 4,123,667 | A | * | 10/1978 | Decker | 290/53 |
| 4,134,710 | A | * | 1/1979 | Atherton | 416/117 |
| 4,141,670 | A | * | 2/1979 | Russell | 415/3.1 |
| 4,327,296 | A | * | 4/1982 | Weyers | 290/53 |
| 4,341,959 | A | * | 7/1982 | Ambli | 290/53 |
| 4,398,095 | A | * | 8/1983 | Ono | 290/53 |
| 4,622,471 | A | | 11/1986 | Schroeder | |
| 5,374,850 | A | * | 12/1994 | Cowen | 290/53 |
| 5,507,943 | A | | 4/1996 | Labrador | |
| 6,140,712 | A | * | 10/2000 | Fredriksson et al. | 290/53 |
| 6,291,904 | B1 | | 9/2001 | Carrol | |
| 6,388,342 | B1 | * | 5/2002 | Vetterick et al. | 290/53 |
| 7,040,089 | B2 | | 5/2006 | Anderson | |
| 7,479,708 | B1 | | 1/2009 | Sternitzke | |
| 7,735,317 | B2 | * | 6/2010 | Welch, Jr. | 60/398 |
| 2009/0102199 | A1 | * | 4/2009 | Voropaev | 290/53 |
| 2010/0045045 | A1 | * | 2/2010 | Turner | 290/53 |
| 2010/0117364 | A1 | * | 5/2010 | Harrigan | 290/52 |

* cited by examiner

*Primary Examiner*—Michael C Zarroli
(74) *Attorney, Agent, or Firm*—Marc E. Hankin; Kevin Schraven; Hankin Patent Law, APC

(57) ABSTRACT

The invention is an apparatus and method for harnessing wave energy by transforming it in potential energy of water in a reservoir, to be converted in mechanical energy through a classical, proved in time, low head water turbine. The invention maximizes the throughput by raising the water head regardless of the unpredictable wave behavior, to a predictable head. The cost of it is greatly mitigated by sharing the facilities with wind power, desalination and hydrogen generating facilities as well as lodging facilities having all necessary ingredients generated on board.

19 Claims, 10 Drawing Sheets

APPARATUS FOR CONVERTING WAVE ENERGY

CROSS-REFERENCE TO RELATED APPLICATIONS

Priority is claimed to U.S. Provisional Patent Application Ser. No. 61/215,251, filed on May 4, 2009, titled "Wave Energy Converting Methods and Systems", U.S. Provisional Patent Application Ser. No. 61/216,814, filed on May 22, 2009, titled "Wave Energy Converter", and U.S. Provisional Patent Application Ser. No. 61/270,994 filed on Jul. 16, 2009, all three by inventor Dan Nicolaus Costas, and the contents of all three of these priority applications are expressly incorporated herein by this reference as though set forth in full.

FIELD OF INVENTION

This invention relates to the method and apparatus for converting the wave energy into electrical energy by converting the raised level of water accumulated from the waves. More particularly, the invention relates to a method and apparatus for converting the random bursts of energy given by waves into a predictable raised level of water capable of powering a low head turbine.

BACKGROUND

For over a century, hundreds of inventions tried to offer solutions for exploitation of energy packed in waves. In the last few decades, more efforts have been directed towards converting the vast amounts of unharnessed natural resources. One of them is the wave energy.

Ocean's waves pack more energy that can be harnessed than the wind and solar energy combined. This energy is available 60% of the time and the oceans cover 70% of the earth surface.

It has been estimated that waves can pack as much as 70 KW of power per each linear meter of wave; therefore a 15 meter long wave can deliver over 1 MW if somehow its energy could be exploited in a practical manner.

The methods currently employed for extracting the wave's energy fall basically in to four main categories point absorbers, attenuators, terminators, and overtopping.

Point absorbers, are buoys using the heaving motion of the waves that is being converted to mechanical and than electrical energy, or directly to electrical energy like Power Buoy of Ocean Power Technology.

Attenuators, like McCabe's Wave Pump or "Pelamis" which use a few floating bodies hinged together which are in relative motion to each other due to the passing waves. At the hinging point, hydraulic pistons push oil in hydraulic motors which in turn actuate electric generators.

Terminators, like Oscillating Water Column (OWC) employed in the "Mighty Whale" Japanese project or in various shore based projects like the one on the Pico island.

Overtopping, employed either on shore or on a floating structure like the "Wave Dragon" Danish project involving also Germany, Sweden, UK and Austria.

The first two categories employ mechanical devices that are inefficient and demand a high capital cost due to the demanding conditions out in the ocean. The seals needed, the inability to service on the spot, the dangerous conditions of even approaching the devices to be tugged for service make them undesirable as viable solutions. They also need a long "trial and error" validation period for not being proven in time technologies. The vast majority of the inventions fall in this category, with all kinds of mechanics being imagined, most of them using floating members that are moved by the waves in relative motion with fixed members attached to the ocean floor or held in position by other means. They are also by their nature inefficient, being capable of extracting only small fractions of energy contained in a wave.

The last two categories use the wave's energy to actuate air, respective water turbines which in turn actuate electrical generators as does the proposed invention. For this reason they will be closer analyzed. The OWC is mostly used on shore where a trapezoidal chamber communicates on the lower side with the sea water allowing the incoming wave to raise the inside level of water. When the wave retreats, on a through, the level of the water inside will drop. This raising and lowering of the water level inside the chamber acts as a piston, pushing and pulling the air above it through a narrow hole where a Wells turbine rotates, actuating an electric generator. The Wells turbine, named after its inventor is a self rectifying turbine, which rotates in the same direction regardless of the direction where the air is coming from.

The advantage of this concept is a simple design that has no moving parts except the group of turbine-generator.

The disadvantages are:
low efficiency of the air turbine.
limited size of the chamber which cannot be bigger than the order of magnitude of a wave or the principle won't work, therefore for each chamber a separate turbine-generator is needed.

Chambers cannot be coupled to actuate one bigger turbine generator group. Most of the kinetic energy of the wave is wasted due to the fact that the separating wall of the chamber is always submerged.

The existing OWC systems are mostly placed on shore where the waves lost most of the energy they had on deep water, besides the fact that the sites need to have appropriate configuration and constitute expensive real estate. Due to the fact that there are significant periods of time between waves and also the lowering is slower than the rising level inside the chamber, the Wells turbine tends to stall. A high level of noise of the air turbine limits the number of sites where it can be used on shore.

The overtopping is used on the "Wave Dragon", a floating structure that has a ramp (artificial beach) on which the wave climbs due to its kinetic energy and spills over into a basin above the sea water level from where it falls through a water turbine that actuates an electric generator much like in a regular hydro power plant. The concept is simple and this is one of its advantages.

Another obvious advantage of this design is the use of a technology that has long been used and perfected. Below will outline a few specifics of the turbines used in this environment for decades proving their feasibility. Water turbines which are suitable for this purpose have been used in low head river water power plants for many decades and have been developed to a high level of efficiency and reliability. In France the 240 MW La Rance tidal power station has been using such turbines in a salt water environment since 1967. Thus, in contrast to most of the WEC principles, a proven and mature technology can be used for the production of electrical energy.

Turbine operating conditions in a WEC are quite different from the ones in a normal hydro power plant. In the Wave Dragon, the turbine head range is typically between 1.0 and 4.0 meters, which is on the lower bounds of existing water turbine experience. While there are only slow and relatively small variations of flow and head in a river hydro power plant, the strong stochastic variations of the wave overtopping call for a radically different mode of operation in the Wave Dragon. The head, being a function of the significant wave height, is varying in a range as large as 1:4, and it has been shown by Knapp (2005) that the discharge has to be regulated within time intervals as short as ten seconds in order to achieve a good efficiency of the energy exploitation.

From a river hydro power installation which is properly maintained, a service life of 40-80 years can be expected. On an unmanned offshore device, the environmental conditions are much rougher, and routine maintenance work is much more difficult to perform. Special criteria for the choice and construction of water turbines for the Wave Dragon have to be followed; it is advisable to aim for constructional simplicity rather than maximum peak efficiency.

By stopping a number of turbines at lower flow rates, the flow rate can be regulated over a wider range without sacrificing efficiency. Single units can be taken out of service for maintenance without stopping production. Capacity demanded for hoisting and transport equipment to perform repair and maintenance work is greatly reduced. The smaller turbines have shorter draft tubes, and are thus easier to accommodate in the whole device. The smaller turbines have a higher speed, which reduces the cost of the generator.

Another advantage of the Wave Dragon by being a floating structure is the possibility of being moored in deep waters where the energy of the wave is not diminished by the sea floor and there is no real estate cost involved. There are quite a few important drawbacks of the overtopping devices, and in particular regarding the Wave Dragon. The capacity of the water reservoir has to be significant to feed the turbine between two waves. It is 8,000 cubic meters which means over 8,000 tons of water to be lifted and held above the sea level in a precarious act of balancing. It is like a plate filled with water which easily will spill when shaken. The structure to hold all this weight becomes significantly bulky and expensive. The mooring lines and anchoring will have to be dimensioned accordingly mostly taking also in consideration the two floating wings that spread sideways to gather the waves giving a span of 300 meters to the whole structure.

Underneath there are pockets of air (air cavities) for lifting and lowering the structure such that always the ramp is at the proper height depending on the height of the incoming waves. If the ramp is too high, the incoming wave may not make it over or too little water will be added to the reservoir. If the ramp is too low, the water will just wash over the reservoir not giving enough head for the turbine.

A sophisticated "just in time" automation system will have to keep this huge structure in balance at all times since the level of the ramp has to continuously keep up with the surrounding conditions, the amount of momentary load (variations of thousands of tons of water weight of load on the structure in a matter of seconds between waves), the task of keeping an even keel, horizontal position at all times in choppy waters. The turbines are equipped with cylindrical vanes that close when there is not enough head and reopen when enough flow of water is assured. In stormy weather the structure sinks to a standby low profile by letting out the air of the air pockets.

Most of the kinetic energy of the incoming wave is cancelled by the vertical component of the ramp to push over the upper edge of the ramp from where the water falls to a lower level in the reservoir to a lower potential energy. This amounts to lower efficiency in the process of conversion of the wave's energy. If somehow, the top of the ramp could be continuously adjusted with the water level inside the reservoir, this would always be the optimum level over which the water in the wave will spill. If also somehow the gap between the waves could be bridged, a continuous flow of water into the reservoir would keep up with the continuous demand of the turbine and the big buffering reservoir won't be necessary. A more efficient less expensive structure would assure the continuous functioning of the already described water turbine generator group.

The proposed invention solves these problems. The invention assures the conversion of the kinetic and potential wave energy in potential energy of water feeding a water turbine.

SUMMARY OF THE INVENTION

To minimize the limitations of the prior art, and to minimize other limitations that will become apparent upon reading and understanding the present specification, the present invention is a method and apparatus for converting the kinetic and potential energy of waves in potential energy of water with higher head, capable to actuate a hydro turbine which in turn actuates an electrical power generator.

One embodiment of the invention is to accumulate water in a reservoir by using the potential energy of the passing wave in raising the water level in the reservoir by allowing the water to enter through the bottom and the side walls of the reservoir through pipes that have their free end raised above the water level by floating means. Preferably there is a plurality of pipes feeding the reservoir.

The apparatus may further comprise one or more side wall openings oriented towards the incoming wave such that the wave's kinetic energy will contribute to raising the water level in the reservoir, beyond the level generated by the wave's potential energy.

These openings can be either one way valves or flexible pipes having their free ends floating slightly higher than the level of water inside the reservoir, such that the water can flow in, but not flow out of the reservoir.

Since the water can get in the reservoir through both the bottom as well as side walls instead of over the top, there is no need for the reservoir to constantly raise and lower its level in order to capture the waves which don't have equal amplitudes.

The raised level of water in the reservoir constitutes the head of one or preferably a plurality of hydro turbines, similar to any low head hydro power plant, thus using well verified and optimized in time technology. Since the power of a turbine is direct proportional with the head and the debit of water, a high volume of water is needed for a significant amount of power. Furthermore, the head of the turbine can be increased by discharging its water not directly into the sea which momentarily is on high levels, but in a secondary reservoir which keeps a constant low level due to the fact that it discharges its water through various pipes, always having some of them on a through.

For this, the reservoir needs to cover as big of a surface of water in a good energy wave environment as possible. To achieve this, preferably more floating reservoirs are coupled together, in a horseshoe configuration sharing electrical, logistical and infrastructure facilities. They also can be designed as moored floating structures, such that can host offshore wind turbines and recreational facilities, thus offsetting the construction price. Having electrical power generated on board, desalination, hydrogen generating, and modular locative spaces can be tugged and easily connected to the structure. The horseshoe shape will provide a smooth portion of water inside, capable of accommodating berthing, aquaculture, sports and vacationing facilities.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention. It is the goal of this invention to provide a method of maximizing the conversion of wave's energy in potential energy of water that actuates a water turbine.

Figure 1:
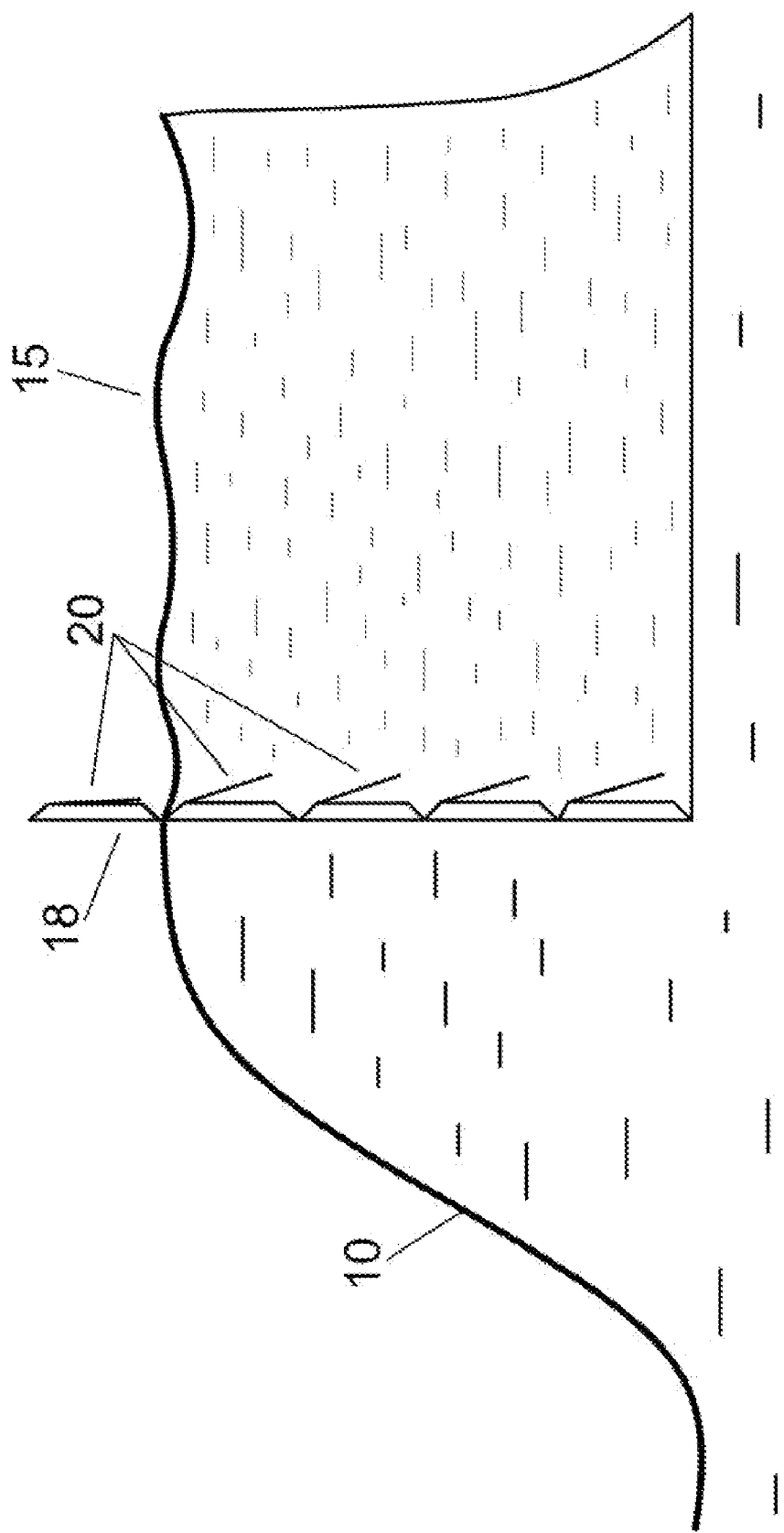
FIG. 1 is a sectional view of a reservoir of one embodiment of the invention, wherein the reservoir is filled by wave through one way valves.

FIG. 1 is a sectional view of a reservoir of one embodiment of the invention, wherein the reservoir is filled by wave through one way valves. FIG. 1 shows a water tank where water accumulates due to the fact that the pressure of the incoming wave 10 being higher than the static pressure of the water inside 15 forces its way through the one way swing valves 20 in the wall 18. After the wave has passed, the static pressure will close the valves 20, retaining the water inside. The swing valves 20 are prone to fouling and after a while need to be cleaned or replaced.

Figure 2:
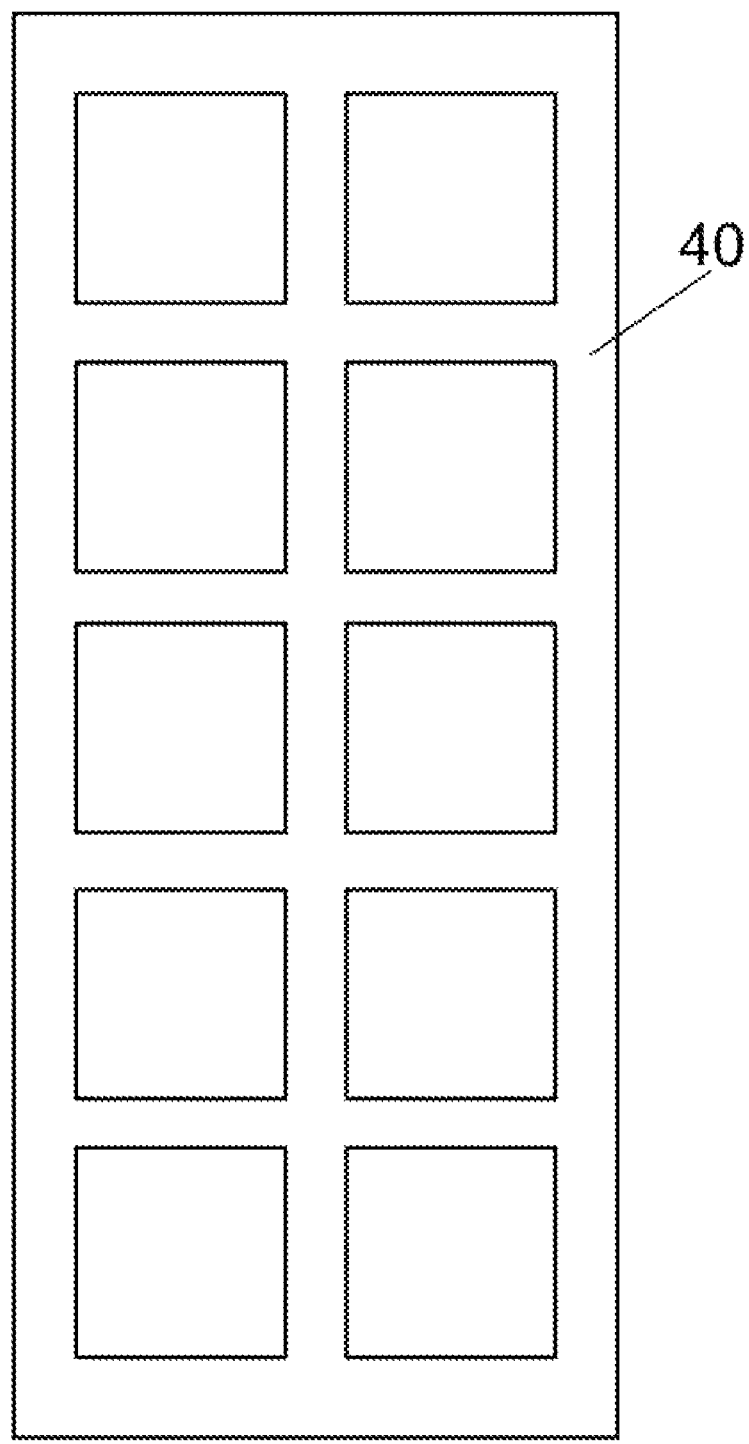
FIG. 2 is a frontal view of a removable frame with valves of one embodiment of the invention.

FIG. 2 is a frontal view of a removable frame with swing valves of one embodiment of the invention. For this they will be built preferably of injected plastic in a frame like configuration 40 FIG. 2 ready for exchange during a service routine.

Figure 3:
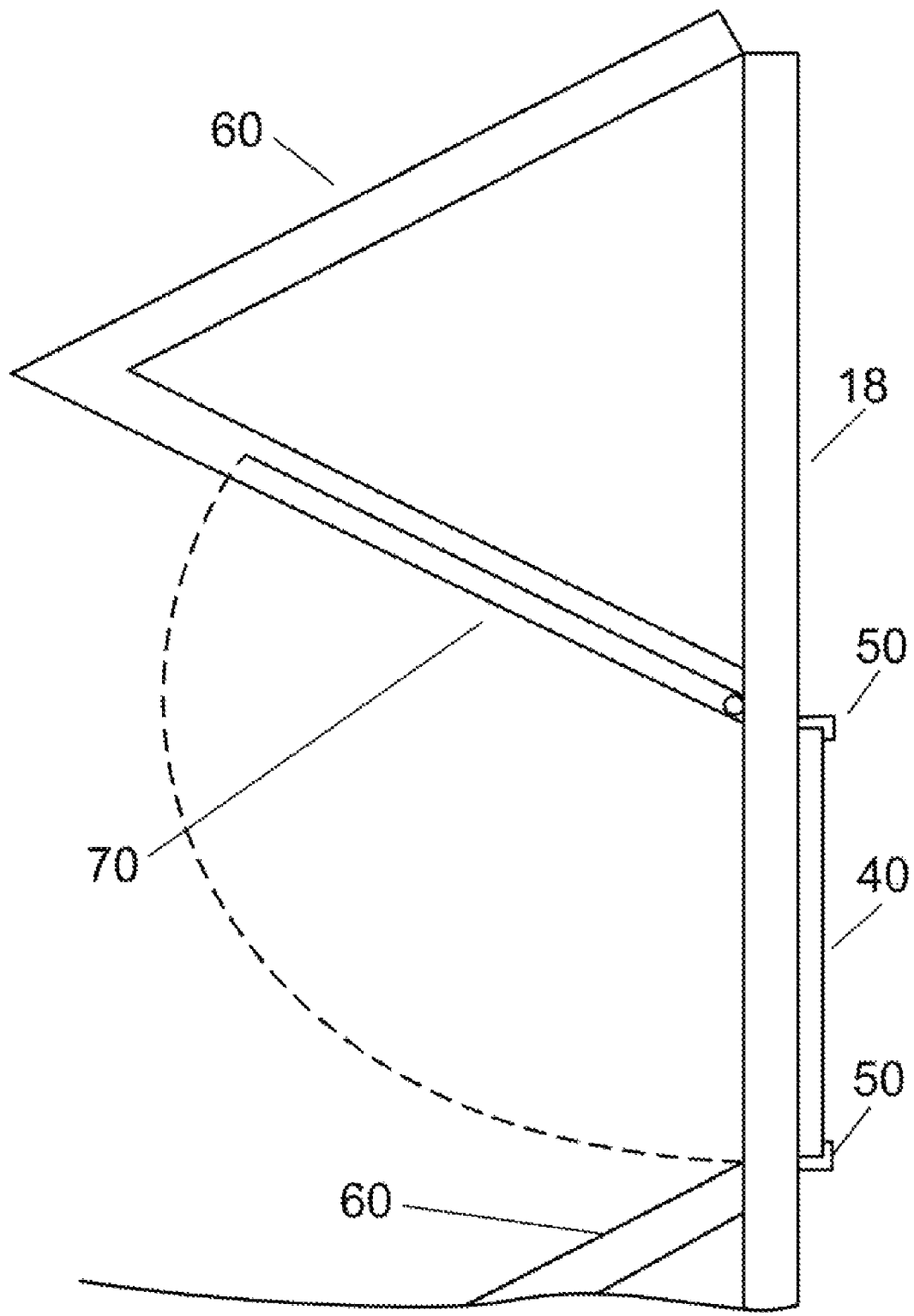
FIG. 3 is a top view of a configuration with valve frames of one embodiment of the invention.

FIG. 3 is a top view of a configuration with valve frames of one embodiment of the invention, where the wave approaches from the left, and the water will be retained in the reservoir to the right part of the drawing. This frame 40 can easily slide along rails 50 in a frame, part of side wall 18, where concentrating rising walls 60 gather the wave raising its level. Swinging gate 70 is provided to prevent the wave interference while changing or servicing the valves frame 40.

Figure 4:
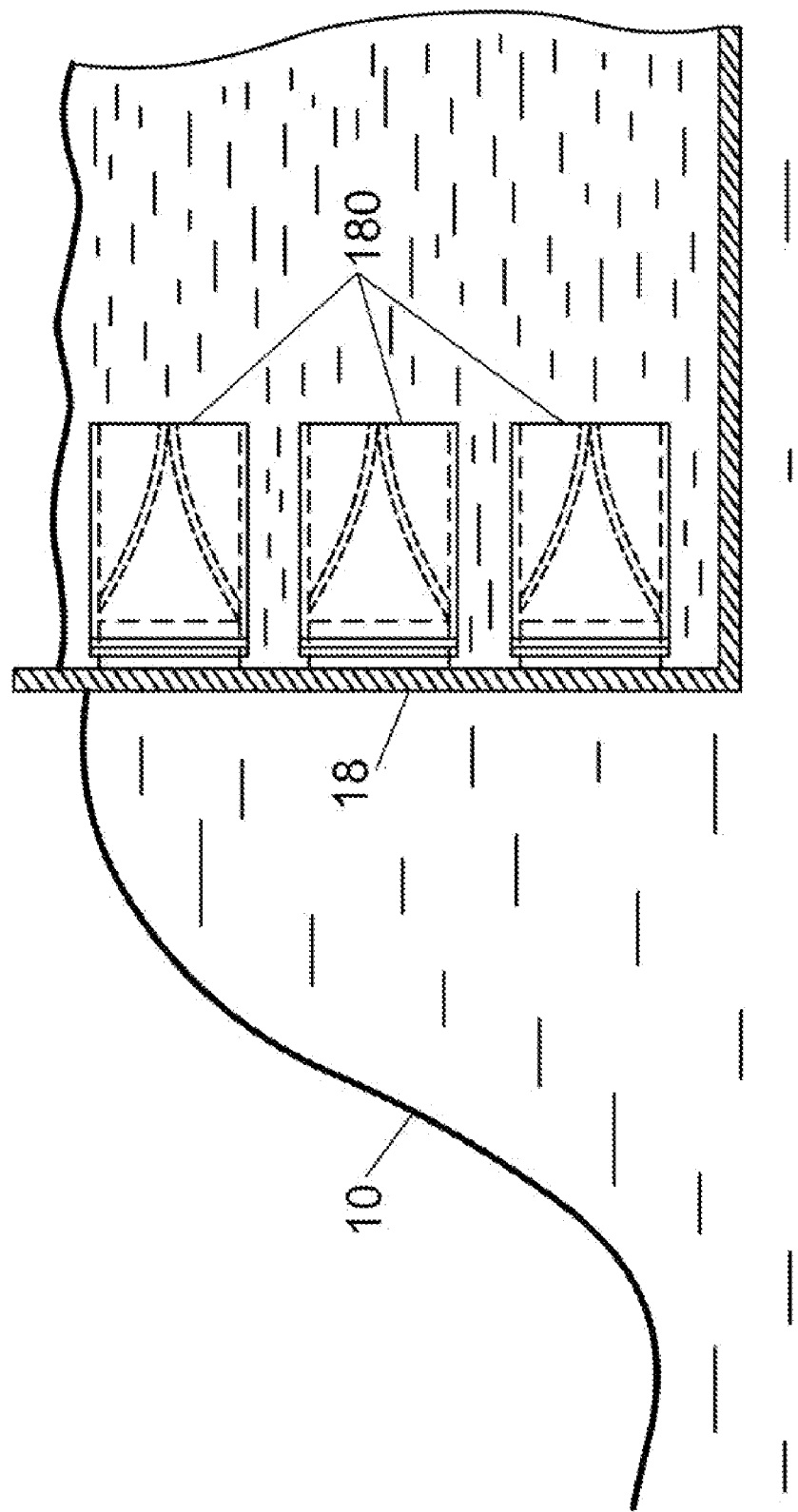
FIG. 4 is a sectional view of a reservoir with flexible valves of one embodiment of the invention.

FIG. 4 is a sectional view of a reservoir with diaphragm check valves of another embodiment of the invention. An alternate way is shown in FIG. 4 where the valves 180 are made of a flexible, rubbery type of material. They are opened by the pressure of the incoming wave 10 and closed by the static pressure, shown with interrupted line, after the wave has passed.

Figure 5:
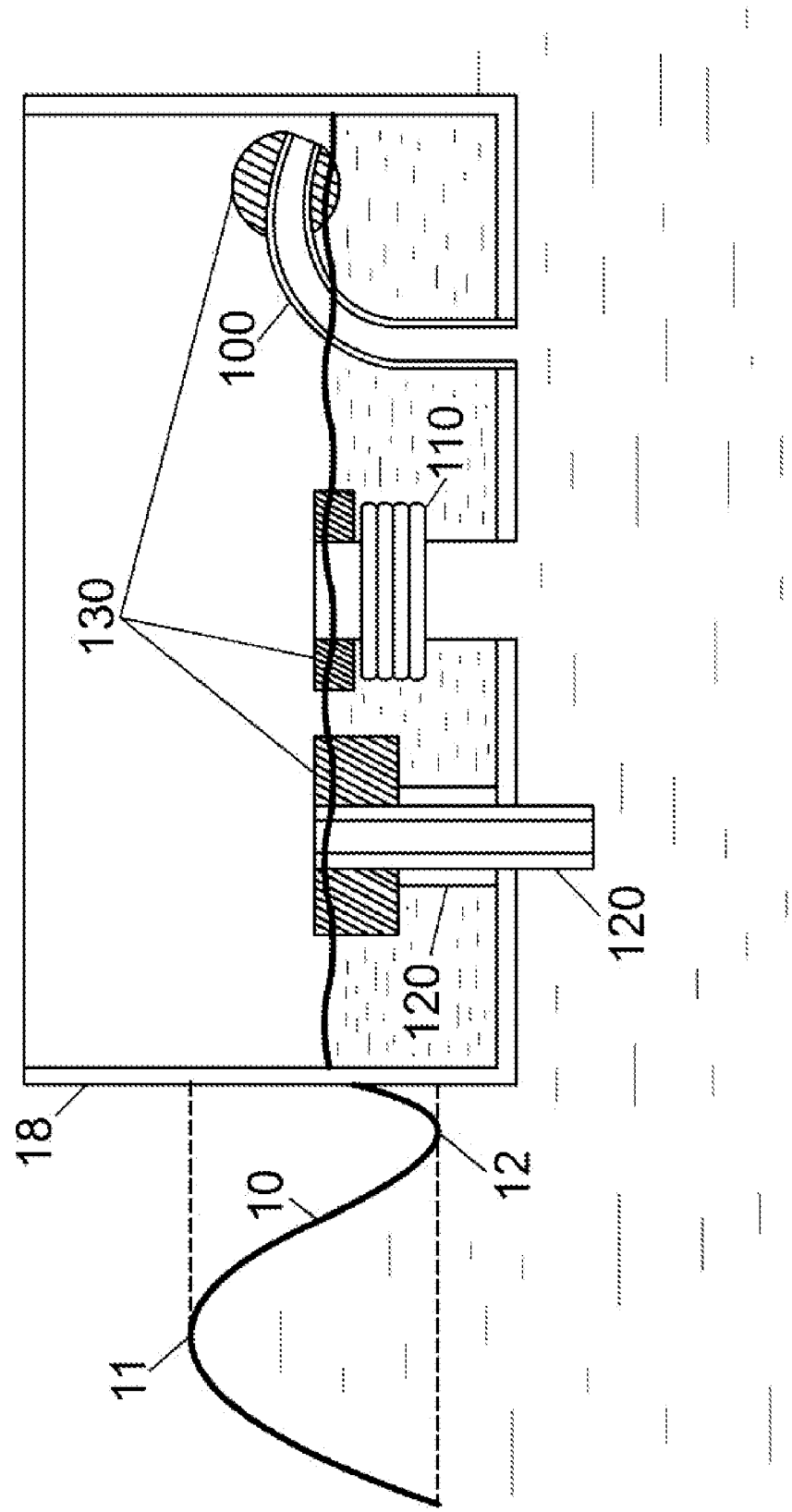
FIG. 5 is a sectional view of a reservoir filled with water through bottom pipes with distal ends held by floaters using potential wave energy of one embodiment of the invention.

FIG. 5 is a sectional view of a reservoir filled with water through bottom pipes with distal ends held by floaters using potential wave energy of one embodiment of the invention. If the use of mechanical valves is not desired, the wave can enter the water tank through flexible pipes 100, accordion type 110 or telescoping type 120 held by floating means at their ends 130 such that always their free ends are above the water level as shown in FIG. 5. The pressure exercised on the bottom of the reservoir will cause a stream of water to rise through these pipes, raising the water level inside and raising the distal ends of the pipes, such that the water cannot return into the sea through the same bottom openings thus raising the head of the water inside.

Figure 6:
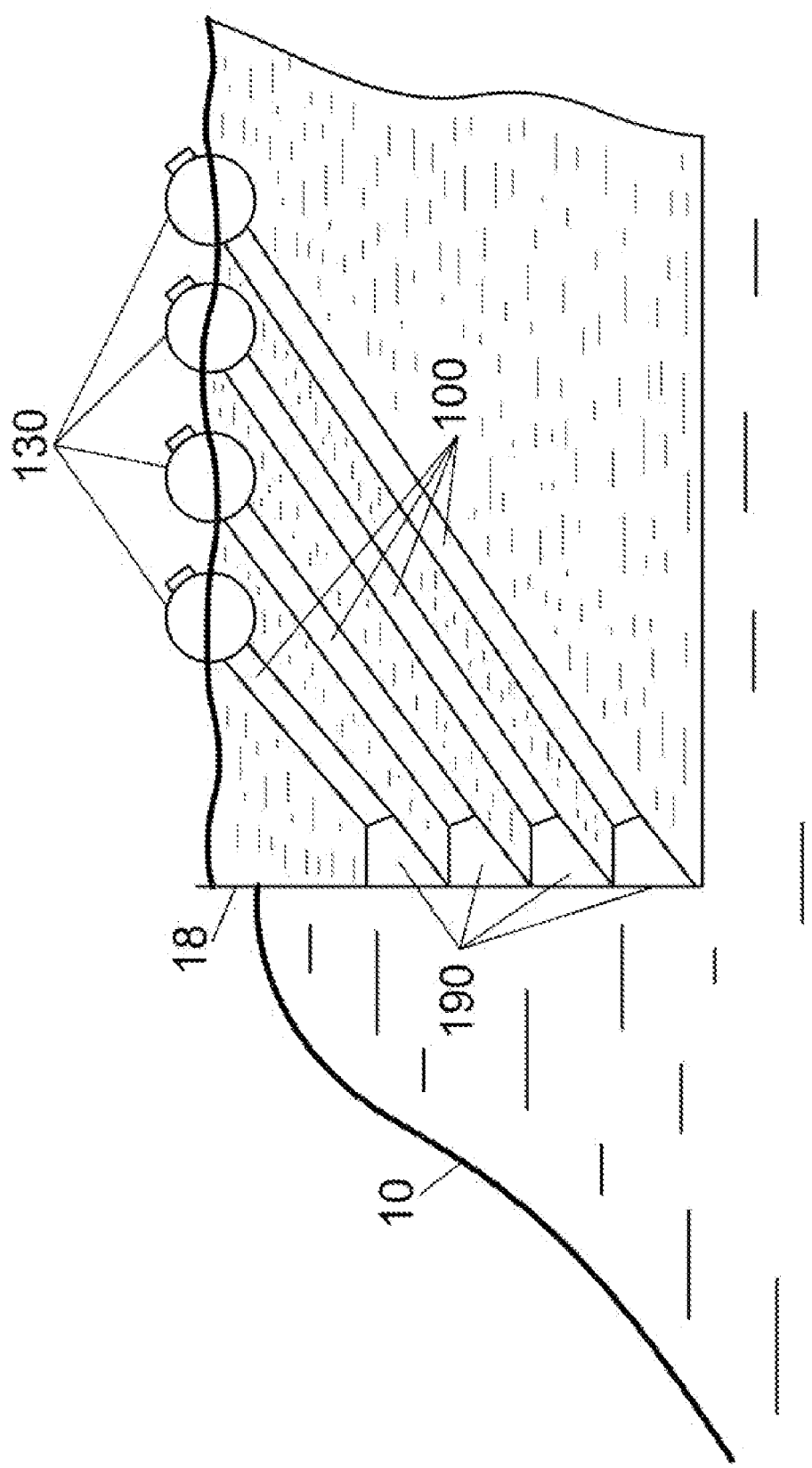
FIG. 6 is a sectional view of a reservoir filled with water through side wall pipes with distal ends held by floaters using potential and kinetic wave energy of one embodiment of the invention.

FIG. 6 is a sectional view of a reservoir filled with water through side wall pipes with distal ends held by floaters using potential and kinetic wave energy of one embodiment of the invention. The entrance to pipes 100 is preferably made through narrowing chambers 190, FIG. 6 such that the water will gain speed as in a Venturi configuration. The accelerated stream of water due to its kinetic energy will give an additional head to the water inside the reservoir. The floating ends will insure again that the water inside the reservoir cannot return to the sea through the same pipes.

Figure 7:
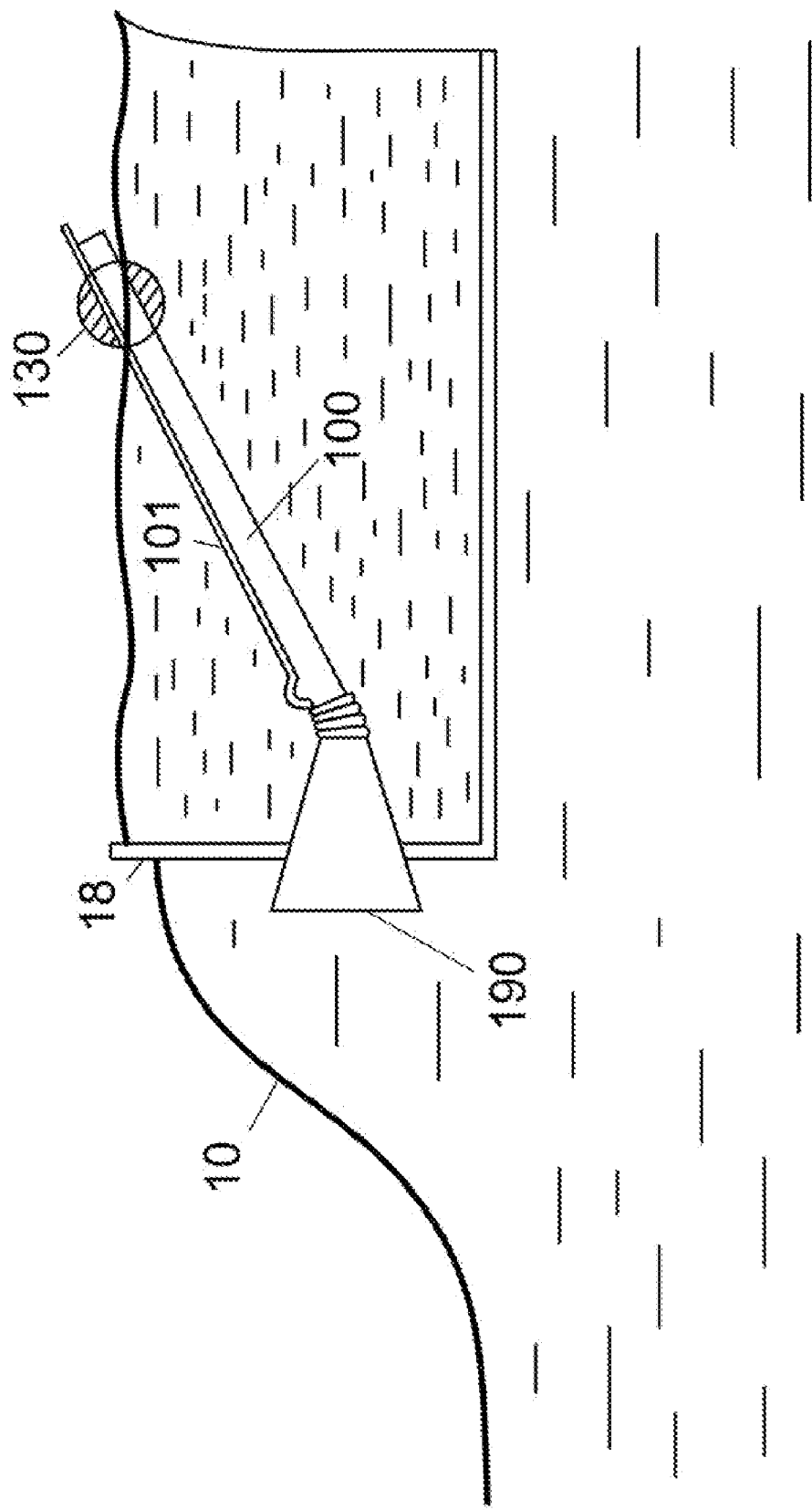
FIG. 7 is a sectional view of a reservoir with a pipe using Venturi effect to lubricate the water with air bubbles of one embodiment of the invention.

FIG. 7 is a sectional view of a reservoir with a pipe using Venturi effect to lubricate the water with air bubbles of one embodiment of the invention. In order to stimulate the travelling water, these pipes can be coated inside with anti repellant substances or air bubble lubrication be employed as shown in FIG. 7. The air is being drawn through smaller diameter pipe 101 by the depression created due to the Venturi effect, and a mixture of water with lubricating air bubbles will emerge through the floating end of pipe 100. The lubrication will lower the drag in the pipe and allow the stream to move with higher speed, giving a surplus of head to the water inside the reservoir. These walls 18 can have a 90 degree angle of incidence with a horizontal plane, less than 90 or more than 90 degrees or a combination of angles as deemed desirable. These walls 18 and bottoms through which water can enter but cannot exit will be part of a primary accumulation reservoir 211 that collects water and retains it at a higher level depending on the height of the waves, than the sea level actuating a primary water turbine 200. The circuit of water in this situation is between the primary reservoir 211, through the primary turbine 200 and back into the sea. Preferably there are more smaller primary turbines 200 and they will be temporarily opened or closed depending on the volume and head of water in the primary accumulation reservoir 211.

Figure 8:
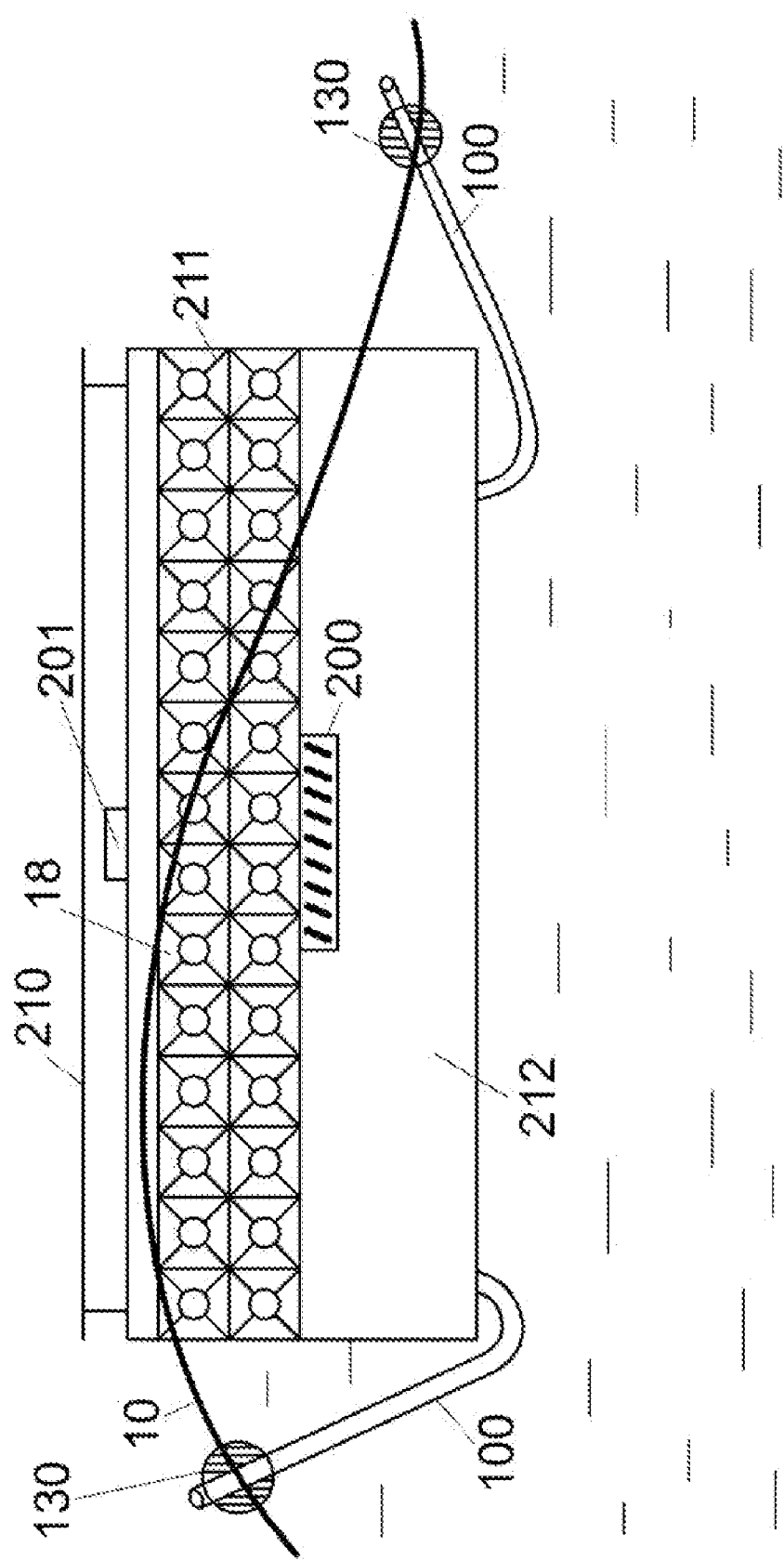
FIG. 8 is a side view of an apparatus with discharge reservoir for higher head of one embodiment of the invention.

FIG. 8 is a side view of an apparatus with a primary discharge reservoir for higher head of one embodiment of the invention. This water gets back into the sea through one or preferably a plurality of water turbines 200 as shown in FIG. 8. These turbines actuate electrical generators 201. The walls 18 will be oriented towards the incoming waves by the mooring systems employed. The central part, not shown, assures the flotation and preferably has air cavities underneath which can be flooded in stormy situations for offering a low profile and also assure a more amortized heaving motion. To amplify the head of the turbine, the primary turbine 200 can be mounted lower than normally would have been, by discharging its water not in the sea, but in a lower primary water reservoir 212 therefore the primary circuit of water is between the higher primary accumulation reservoir 211 through the primary turbines 200 into the primary discharge reservoir 212. This primary discharge reservoir 212 gets emptied into the surrounding sea at a through by employing the same one way flow of water technique previously described, but in a reversed direction, from the primary discharge reservoir 212 reservoir in to the sea. Since the length of these pipes can be adjusted, some of them can have their far ends, the ones with the floating means at a through at all times, thus assuring a continuous discharge of water from the reservoir into the sea and therefore a continuous higher head for the turbine at all times as shown in FIG. 8

The bridge 210 on top of the reservoir, preferably made of perforated material to allow the water of a possible big incoming wave to wash into the upper reservoir, will hold any structures deemed necessary, like warehousing for spare parts and supplies, walk ways and bungalows.

Figure 9:
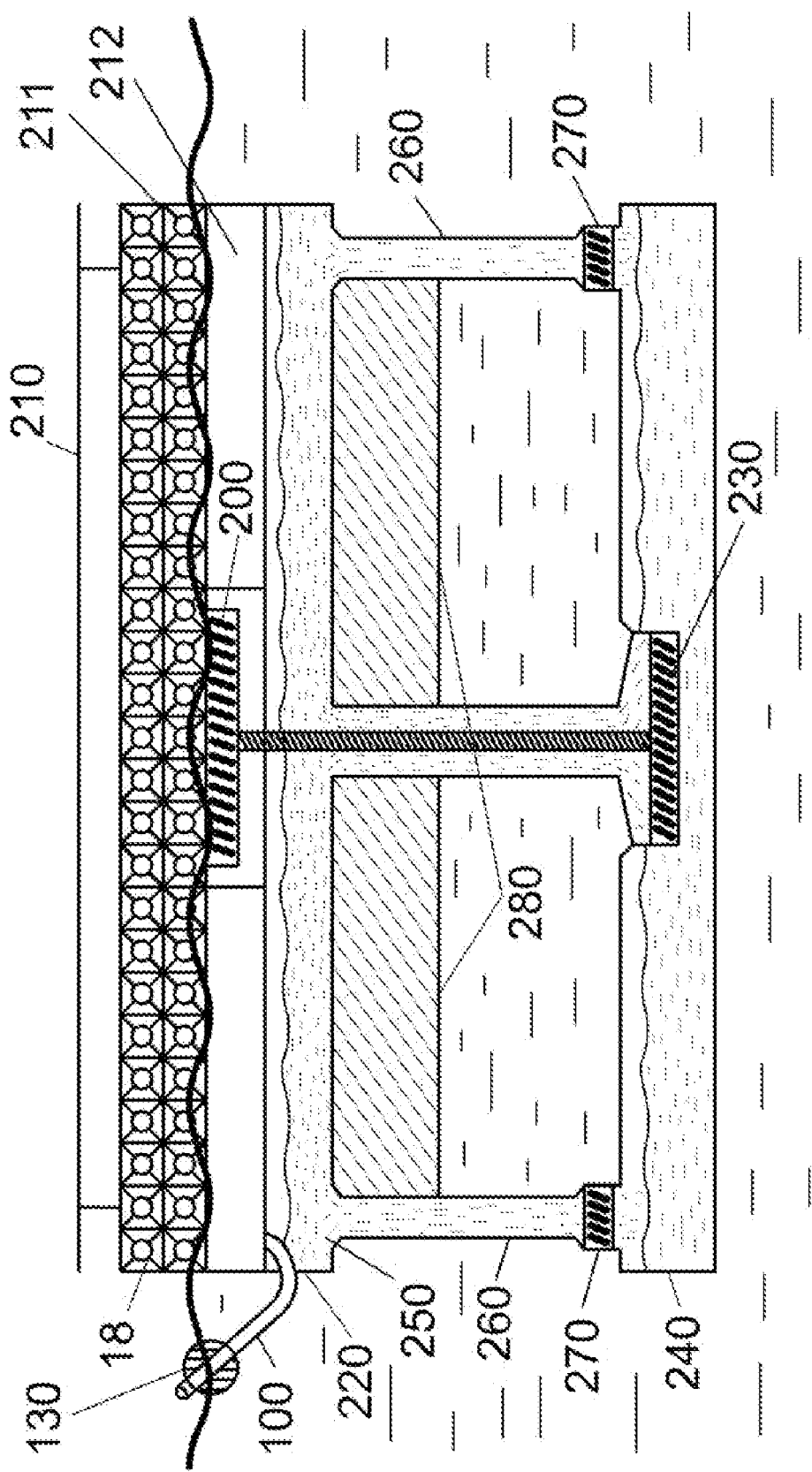
FIG. 9 is a side view of an apparatus with pump and secondary turbines of one embodiment of the invention.

FIG. 9 is a side view of an apparatus with a primary circuit where the primary turbine actuates a pump which raises the fluid level of a secondary fluid circuit of another embodiment of the invention. An alternate option is shown in FIG. 9 where the primary water turbine 200 described in FIG. 8, instead of an electrical generator actuates a pump 230 of a secondary circuit which in turn pumps a fluid, like desalinated water, from the lower secondary reservoir 240 to the higher secondary reservoir 250 from which the fluid falls with a high predictable head through columns 260 actuating secondary turbines 270 which are connected to electrical generators not shown, generating continuous electrical power ready for the grid. The structure is kept afloat by floating means 280 equipped preferably with air cavities, while the lower secondary reservoir 240 has also the function of dampening the heaving motion due to the fact that it has a large surface under the water, offering high resistance to up and down motion. Since the energy packed in waves is measured in KW/m, the more wave crest is captured, the more energy can be used, therefore the structures either fixed or floating should cover as much sea surface as possible. Preferably they would be made of reinforced concrete which is inexpensive, resilient to the sea salt water environment, and feasible for building massive structures. They can be prebuilt in modules in shipyards and tugged to the mooring places away from sight in conveniently rich energetic wavy deep waters. For capital repairs they also can be tugged back to the shipyards.

Figure 10:
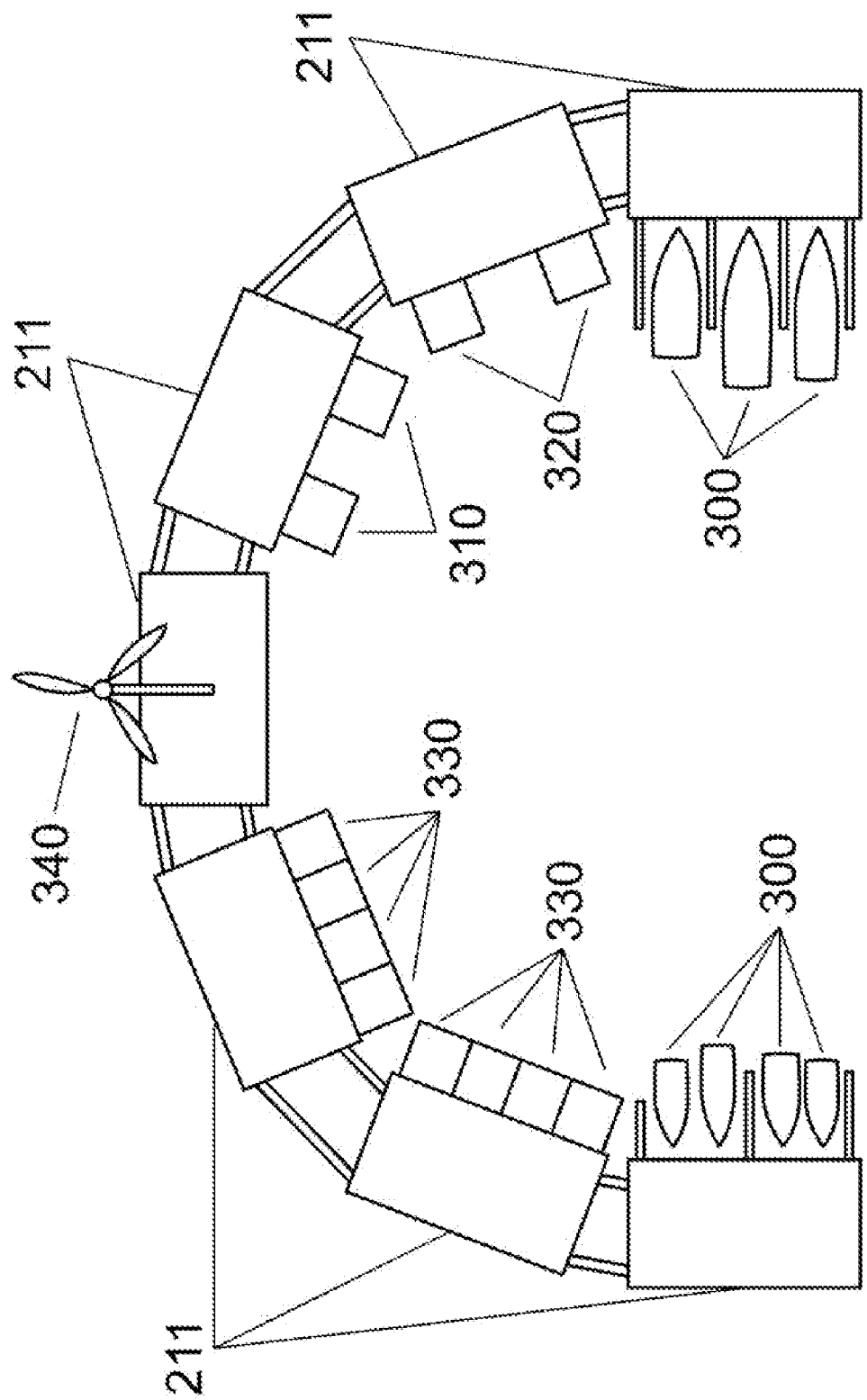
FIG. 10 is a top view of interconnected apparatuses of one embodiment of the invention sharing facilities.

FIG. 10 is a top view of interconnected apparatuses of one embodiment of the invention sharing facilities. A horseshoe configuration as shown in FIG. 10, with modular connected units having whose bridges 211 are seen from top, as depicted in FIG. 8 and FIG. 9 is desirable, such that always the waves feed the outside of the horseshoe, while the inside has calm waters where watercraft 300 can be moored and also additional units like desalination 310, hydrogen making 320 and living spaces with underwater view 330 can be simply tugged and attached any time to form maritime communities. Being big floating modules, they can serve as hosts for wind turbines 340 sharing the electrical and other facilities, offsetting the building costs. Since the majority of the floating wind turbine costs are allocated for floating and mooring, their location out of site and in open sea with higher energy winds is very desirable. The creation close to shore of such self sufficient floating islands with water sports and recreation facilities is desirable for decongesting the shore resorts. Their destination as green energy providers would facilitate the permitting process, while their multiple ways of returning the capital investment would make them attractive targets for the financial community. Clustering together such horseshoe configurations with enough clearance to fully exploit the waves energy, can form the communities of the future, decongesting the shores.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. An apparatus for converting wave energy comprising:
   one or more water turbines;
   a water reservoir;
   wherein said water reservoir has a bottom and one or more sides;
   wherein said bottom and one or more sides have one or more openings;
   wherein said one or more openings allow a water to pass into said water reservoir;
   wherein said one or more openings prevent said water from exiting said water reservoir;
   wherein said water is propelled through said one or more openings into said water reservoir by a wave energy of said water;
   wherein said water entering said water reservoir through said one or more openings raises a water head inside of said water reservoir;
   wherein said raised water head inside said water reservoir feeds said one or more water turbines;
   wherein said potential energy of said water is converted by said one or more water turbines into a mechanical energy; and
   a discharge reservoir and one or more discharge reservoir exit pipes;
   wherein said one or more discharge reservoir exit pipes have a floating end and a reservoir end;
   wherein said floating end of said one or more discharge reservoir exit pipes is held above a surrounding water level by a floating device wherein said water from said one or more turbines is discharged into said discharge reservoir;

wherein said water from said discharge reservoir is discharged into a body of water surrounding said discharge reservoir.

2. The apparatus for converting wave energy of claim 1, wherein said one or more openings have one or more one way valves;
   wherein said one or more one way valves allow said water to enter said water reservoir and prevent said water from exiting said water reservoir.

3. The apparatus for converting wave energy of claim 1, further comprising:
   one or more pipes;
   wherein said one or more pipes have an opening end and a floating end;
   wherein said opening end of said one or more pipes are connected to an inside of said one or more openings;
   wherein said floating end of said one or more pipes is held above a reservoir water level by a floating device;
   wherein said one or more pipes allow said water to enter said water reservoir and prevent said water from exiting said water reservoir.

4. The apparatus for converting wave energy of claim 1, further comprising:
   one or more concentrating wall risers;
   wherein said one or more concentrating wall risers direct and concentrate said water entering said one or more openings.

5. The apparatus for converting wave energy of claim 2, wherein said one or more valves are part of one or more frames;
   wherein said one or more frames are removable attached to said one or more openings.

6. The apparatus for converting wave energy of claim 1, wherein said water exits said one or more water turbines into a body of water surrounding said water reservoir.

7. The apparatus for converting wave energy of claim 1, further comprising:
   a bridge;
   wherein said bridge is a perforated platform on a top side of said water reservoir.

8. The apparatus for converting wave energy of claim 1, wherein said apparatus is connected to one or more wind turbines.

9. The apparatus for converting wave energy of claim 1, wherein said apparatus is connected to one or more water desalination facilities.

10. The apparatus for converting wave energy of claim 1, wherein said apparatus is connected to one or more hydrogen making facilities.

11. The apparatus for converting wave energy of claim 1, wherein said apparatus is connected to one or more dwelling facilities.

12. The apparatus for converting wave energy of claim 8, further comprising:
   a plurality of apparatuses for converting wave energy;
   wherein said plurality of apparatuses for converting wave energy are interconnected such that they share a plurality of facilities and provide one or more areas of smooth water;
   wherein said one or more areas of smooth water make feasible an activity selected from the group consisting of aquaculture, water sports, and mooring.

13. The apparatus for converting wave energy of claim 1, wherein said apparatus is connected to a device selected from the group consisting of one or more wind turbines, one or more desalination facilities, one or more dwelling facilities, and one or more hydrogen making facilities.

14. An apparatus for converting wave energy of water in a primary upper reservoir comprising:
   one or more primary water turbines;
   one or more secondary water turbines;
   a first primary water reservoir;
   an upper secondary fluid reservoir;
   a lower secondary fluid reservoir;
   one or more pumps;
   wherein said first primary reservoir has one or more sides;
   wherein said one or more sides have one or more openings;
   wherein said one or more openings allow a water to pass into said first primary reservoir;
   wherein said one or more openings prevent said water from exiting said first primary reservoir;
   wherein said water is propelled through said one or more openings into said first primary reservoir by a wave energy of said water;
   wherein said water entering said first primary reservoir through said one or more openings raises a water head inside of said first primary reservoir;
   wherein said raised water head inside said first primary reservoir feeds said one or more primary water turbines; and
   wherein said potential energy of said water is converted by said one or more primary water turbines into a first mechanical energy;
   wherein said first mechanical energy powers said one or more pumps;
   wherein said one or more pumps pump a fluid from said secondary lower reservoir to said secondary upper reservoir;
   wherein said fluid cascades down from said upper secondary reservoir to said lower secondary reservoir and passes through said one or more secondary water turbines;
   wherein said one or more secondary water turbines convert said cascading fluid into a secondary mechanical energy.

15. The apparatus for converting wave energy of claim 14, wherein said one or more openings have one or more one way valves;
   wherein said one or more one way valves allow said water to enter said primary water reservoir and prevent said water from exiting said primary water reservoir.

16. The apparatus for converting wave energy of claim 14, further comprising:
   one or more pipes;
   wherein said one or more pipes have an opening end and a floating end;
   wherein said opening end of said one or more pipes are connected to an inside of said one or more openings;
   wherein said floating end of said one or more pipes is held above a reservoir water level by a floating device;
   wherein said one or more pipes allow said water to enter said primary water reservoir and prevent said water from exiting said primary water reservoir.

17. The apparatus for converting wave energy of claim 14, further comprising:
   a primary discharge reservoir;
   one or more primary discharge reservoir exit pipes;
   wherein said one or more primary discharge reservoir exit pipes have a floating end and a reservoir end;
   wherein said floating end of said one or more discharge reservoir exit pipes is held above a surrounding water level by a floating device;
   wherein said water exits said one or more primary water turbines into said primary discharge reservoir;

wherein said water from said primary discharge reservoir exits into a body of water surrounding said primary discharge water reservoir through said one or more discharge reservoir exit pipes.

18. The apparatus for converting wave energy of claim 14, wherein said apparatus is connected to a device selected from the group consisting of one or more wind turbines, one or more water desalination facilities, one or more dwelling facilities, and one or more hydrogen making facilities.

19. The apparatus for converting wave energy of claim 18, further comprising:

a plurality of apparatuses for converting wave energy;

wherein said plurality of apparatuses for converting wave energy are interconnected such that they share a plurality of facilities and provide one or more areas of smooth water;

wherein said one or more areas of smooth water make feasible an activity selected from the group consisting of aquaculture, water sports, and mooring.

* * * * *